(12) United States Patent  (10) Patent No.: US 7,660,135 B2
Fang  (45) Date of Patent: Feb. 9, 2010

(54) UNIVERSAL AC HIGH POWER INVETER WITH GALVANIC ISOLATION FOR LINEAR AND NON-LINEAR LOADS

(75) Inventor: Si Jian Fang, Carpentersville, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 337 days.

(21) Appl. No.: 11/805,489

(22) Filed: May 23, 2007

(65) Prior Publication Data

US 2008/0291707 A1  Nov. 27, 2008

(51) Int. Cl.
H02M 3/335 (2006.01)
(52) U.S. Cl. ............................................ 363/17; 363/98
(58) Field of Classification Search .................. 363/17, 363/24–26, 98, 132
See application file for complete search history.

(56) References Cited

U.S. PATENT DOCUMENTS

| 5,677,610 | A | * | 10/1997 | Tanamachi et al. ........... 318/801 |
| 5,936,856 | A | * | 8/1999 | Xiang ........................... 363/98 |
| 6,021,053 | A | | 2/2000 | Baskette et al. |
| 6,404,655 | B1 | | 6/2002 | Welches |
| 6,937,486 | B2 | | 8/2005 | Liu et al. |
| 7,177,165 | B2 | | 2/2007 | Deng et al. |
| 2002/0044461 | A1 | | 4/2002 | Jang et al. |
| 2005/0036341 | A1 | | 2/2005 | Liu et al. |
| 2005/0041439 | A1 | | 2/2005 | Jang et al. |
| 2005/0063205 | A1 | | 3/2005 | Stancu et al. |
| 2005/0152159 | A1 | | 7/2005 | Isurin et al. |
| 2006/0268583 | A1 | | 11/2006 | Pawel et al. |
| 2006/0279966 | A1 | | 12/2006 | Fan et al. |
| 2007/0076451 | A1 | | 4/2007 | Wu et al. |
| 2007/0081364 | A1 | | 4/2007 | Andreycak |

* cited by examiner

*Primary Examiner*—Jessica Han
(74) *Attorney, Agent, or Firm*—Kinney & Lange, P.A.

(57) ABSTRACT

A universal alternating current (AC) inverter system with galvanic isolation takes an unregulated direct current (DC) input and provides a high-quality AC output that may be used in conjunction with both linear and non-linear loads. The universal AC inverter system includes a DC-DC converter for converting an unregulated DC input to a regulated DC output, and a DC-AC inverter for converting the regulated DC output to a high-quality AC output. The DC-DC converter includes a DC link isolation high frequency transformer that provides galvanic isolation between the unregulated DC input and the AC output. To avoid saturation of the transformer, the controller for the DC-DC converter employs a DC offset correction loop that prevents accumulation of DC content on the primary side of the transformer. The universal AC inverter system includes a 4-phase inverter topology that converts the regulated DC voltage provided by the DC-DC converter to an AC output. An inverter controller employs a number of feedback loops that are used to control switches within the 4-phase inverter topology to provide a high-quality AC output voltage for both linear and non-linear loads, including a fast voltage control loop, a slow voltage control loop, a AC output capacitor current control loop, and a DC content control loop.

19 Claims, 5 Drawing Sheets

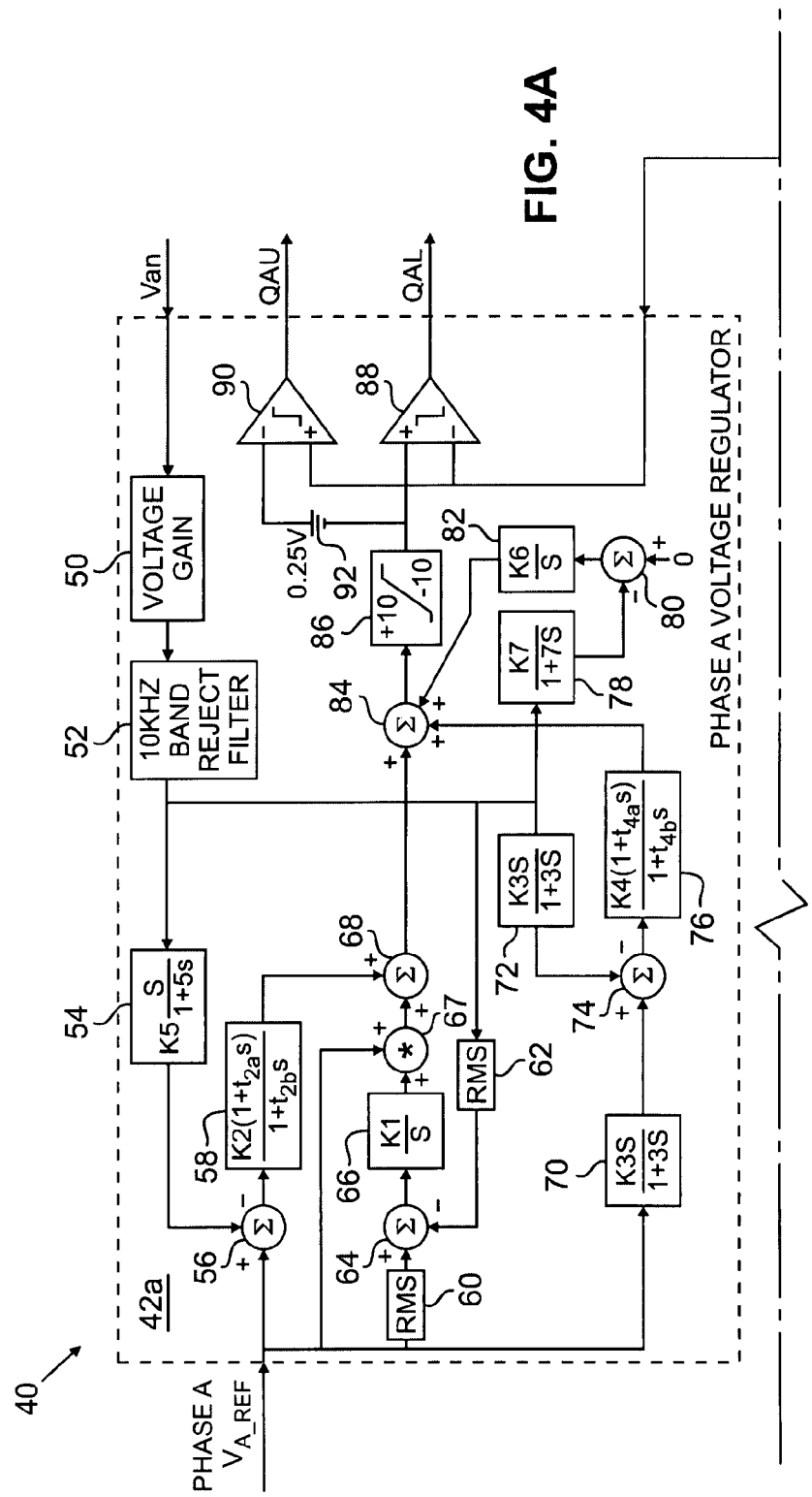

UNIVERSAL AC HIGH POWER INVETER WITH GALVANIC ISOLATION FOR LINEAR AND NON-LINEAR LOADS

BACKGROUND

The present invention relates to inverters for generating alternating current (AC) power, and in particular, to a universal AC inverter capable of providing high-quality AC power for both linear and non-linear loads.

Generators are commonly used to convert mechanical energy to electrical energy. In particular, generators are oftentimes coupled to machines such as diesel engines or similar types of engines. The mechanical energy provided by the diesel engine is provided to the generator, which converts the mechanical energy to an alternating current (AC) output. One of the drawbacks associated with a typical AC generator, particularly for high-power applications, is the prohibitive size and weight of components necessary to generate the high-power output. In addition, a typical AC generator is designed to generate an output voltage at a defined magnitude and frequency. To generate an AC output of a different magnitude or frequency, an entirely separate AC generator would be required, adding significantly to the overall size and weight of components necessary to generate the desired AC outputs.

SUMMARY

In one aspect, the present invention provides a universal AC generator capable of providing AC outputs of varying magnitudes and frequency. The universal AC generator includes a DC-DC converter that converts an unregulated DC input to a regulated DC output. The DC-DC converter includes a transformer that provides galvanic isolation between the unregulated DC input and the AC output, and includes a DC offset correction loop that provides feedback that prevents the accumulation of DC content on the primary side of the transformer. The regulated DC output is provided to a universal AC inverter that converts the regulated DC output to an AC output voltage of a desired magnitude and frequency. An inverter controller generates control signals provided to the universal AC inverter based on monitored AC output voltage of the inverter and a reference voltage defining the desired magnitude and frequency. The inverter controller employs a plurality of control loops to generate the control signals used to provide regulation of the AC output voltage.

In another aspect of the present invention, a DC-DC controller provides control signals to a DC-DC converter to convert an unregulated DC input to a regulated DC output while minimizing DC content within a transformer. The DC to DC controller includes a generator for generating a modulating ramp signal and a voltage compensation loop that monitors a DC output voltage generated by the DC to DC converter and generates an output voltage control signal based on a comparison of the DC output voltage to a DC reference voltage. The DC to DC controller further includes a volt-second correction loop that monitors AC current on a primary side of the transformer, detects DC content within the AC current, and generates a DC content compensation signal based on the detected DC content. A combiner combines the output voltage control signal with the DC content compensation signal to generate a combined signal. A first half-cycle peak current controller generates control signals provided to a first power transistor within the DC to DC converter based on a comparison of the modulating ramp signal to the combined signal. A second half-cycle peak current controller generates control signals provided to a second power transistor within the DC to DC converter based on a comparison of the modulating ramp signal to the output voltage control signal.

In another aspect of the present invention, a universal AC inverter is employed to provide an AC output voltage of a desired magnitude and frequency for linear and non linear loads with very low total harmonics distortion (THD). The universal AC inverter includes a network of switches, at least one inductor, and at least one capacitor. An inverter controller is connected to provide pulse width modulation (PWM) control signals to the network of switches to convert the regulated DC input voltage to a desired AC output voltage. The inverter controller generates the PWM control signals based on a plurality of feedback control loops that use a monitored AC output voltage and an AC reference voltage as input. The feedback control loops include a fast voltage control loop having a high-frequency response for providing a first compensated signal to regulate differences between the AC output voltage and the AC reference voltage, a slow voltage control loop having a low-frequency response for providing a second compensated signal to regulate differences between a root mean square (RMS) value of the AC output voltage and an RMS value of the AC reference voltage, an AC output capacitor current control loop that derives an AC output capacitor current through the at least one capacitor based on the AC output voltage and derives an AC reference current based on the AC reference voltage and provides a third compensation signal to regulate differences between the AC output capacitor current and the AC reference current, and a DC content control loop that provides a fourth compensation signal to regulate detected DC content within the AC output voltage. The first, second, third, and fourth compensation signals are summed together and provided to a PWM generator that generates the PWM control signals based on the summed output of the feedback control loops.

DETAILED DESCRIPTION

A universal alternating current (AC) inverter system with galvanic isolation takes an unregulated direct current (DC) input and provides a high-quality AC output that may be used in conjunction with both linear and non-linear loads. In addition, the topology described with respect to the universal AC inverter system provides a low-cost, lightweight solution to providing high-quality AC power at different magnitudes and frequencies with a single system. In particular, the inverter system is capable of providing high power density conversion to convert a wide range of DC input voltages to a galvanically isolated AC output that can be provided to both linear and non-linear loads.

The universal AC inverter system employs DC link high frequency isolation (within a DC-DC converter) to replace typical AC output low frequency transformer isolation, thereby minimizing the size and weight of the system. The DC-DC converter employed to provide DC link isolation includes a volt-second offset control loop that prevents saturation of the transformer without requiring the use of additional DC blocking capacitors or a gapped core transformer, thereby increasing output power capability. The universal AC inverter system includes a 4-phase inverter topology that converts the regulated DC voltage provided by the DC-DC converter to an AC output. An inverter controller employs a number of feedback loops that are used to control switches within the 4-phase inverter topology to provide a high-quality AC output voltage for both linear and non-linear loads.

Figure 1:
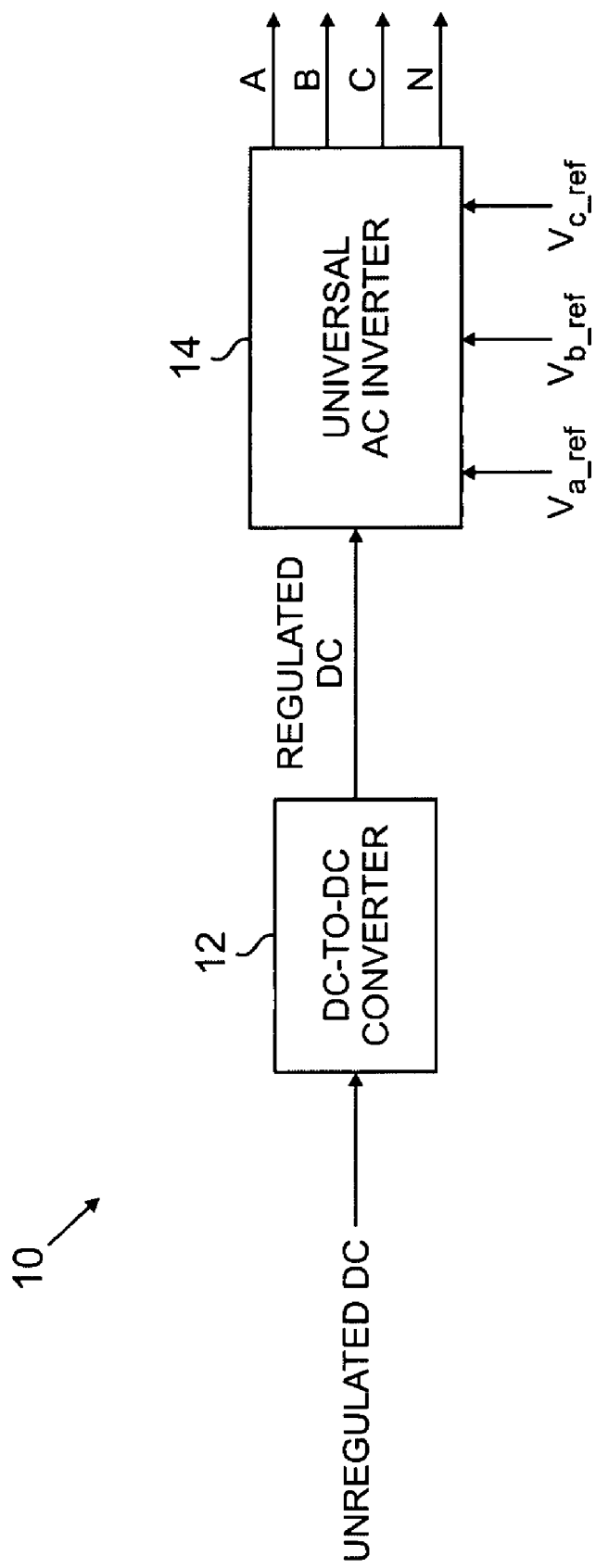
FIG. 1 is a block diagram of a universal alternating current (AC) inverter system with galvanic isolation for generating a regulated AC output having a desired magnitude and frequency.

FIG. 1 illustrates components within universal AC inverter system 10, including DC-DC converter 12 and universal AC inverter 14. DC-DC converter 12 converts unregulated (or wide-ranging) DC input to a regulated DC output, and provides galvanic isolation between the unregulated input and the regulated DC output. Galvanic isolation between the input and output of universal AC inverter system 10 prevents system grounding problems that may otherwise result. Providing galvanic isolation within DC-DC converter 12, as opposed to employing an AC transformer within universal AC inverter 14, reduces the size and weight of universal AC inverter system 10.

Universal AC inverter 14 converts the regulated DC output provided by DC-to-DC converter 12 to a high-quality AC output (labeled Va, Vb, and Vc). A benefit of universal AC inverter 14 is the ability to generate high-quality AC outputs at a plurality of magnitudes and frequencies. In one embodiment, universal AC inverter system 10 is capable of generating an AC output that can be selectively controlled between 120/208 VAC to 277/480 VAC with a line frequency programmable from 50 Hertz (Hz), 60 Hz, to 400 Hz. The desired magnitude and frequency of the AC outputs is controlled by selectively varying the voltage reference values Va_ref, Vb_ref, and Vc_ref. As shown in more detail in FIGS. 3 and 4, universal AC inverter 14 includes a controller that employs a plurality of control loops that allow universal AC inverter 14 to provide high-quality AC power to both linear and non-linear loads. A benefit of this configuration is the ability of a single system to meet the needs of a variety of loads and applications.

Figure 2:
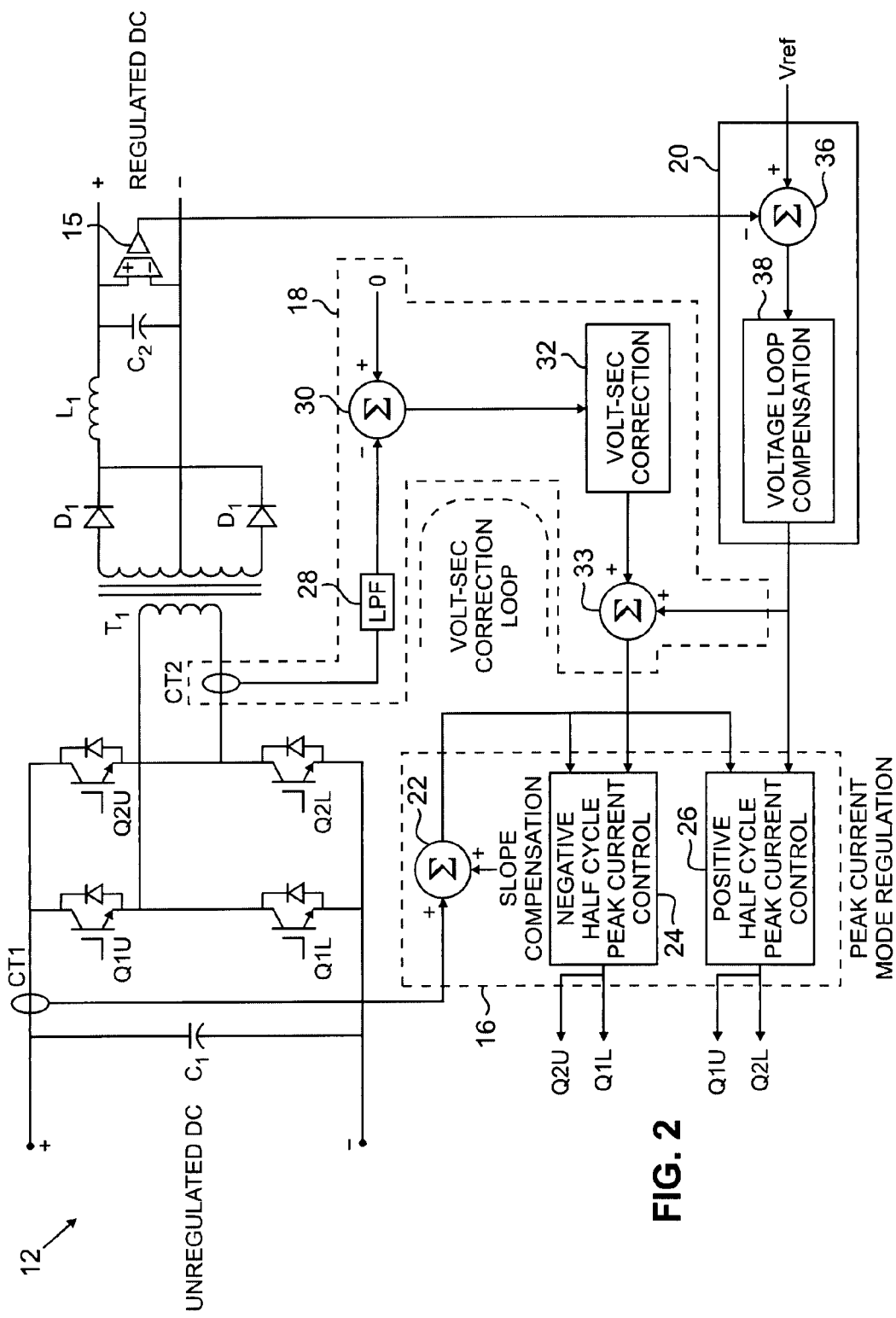
FIG. 2 is a circuit diagram of a direct current (DC) to DC converter with a volt-second correction feedback loop for preventing transformer saturation.

FIG. 2 illustrates one embodiment of DC-DC converter 12. Components included within DC-DC converter 12 include capacitor C1, power transistors Q1U, Q2U, Q1L, Q2L, transformer T1, diodes D1 and D2, inductor L1, capacitor C2, voltage detector 15, peak current mode controller 16, volt-second correction loop 18, and voltage control loop 20.

Power transistors Q1U, Q2U, Q1L, Q2L are connected in an H-bridge configuration and are controlled (i.e., selectively turned 'on' and 'off') to convert the unregulated DC input to an AC output. In other embodiments, other well-known converter topologies may be employed to convert the DC voltage to an AC voltage. In one embodiment, power transistors Q1U, Q2U, Q1L, and Q2L are implemented with insulated gate bipolar transistors (IGBTs), which are commonly employed in high-power applications. The AC output is provided to a primary winding of transformer T1, and a resulting AC voltage is generated on the secondary winding of transformer T1. Depending on the winding configuration of transformer T1, the AC output provided to the primary winding may be increased or decreased as desired. Employing transformer T1 in DC-DC converter provides galvanic isolation between the unregulated input and the regulated output. Diodes D1, D2, inductor L1, and capacitor C2 form a full-wave rectifier that converts the AC voltage to a DC voltage. In other embodiments, other well-known rectifier topologies may be employed to convert the AC voltage to a DC voltage.

To provide regulation of the DC output voltage generated by DC-DC converter 12, the DC output voltage is sampled and provided to feedback loop 20. In the embodiment shown in FIG. 2, a current mode control topology is used to regulate the DC output voltage. As shown in FIG. 2, the current at location CT1 is monitored and the slope of the monitored current (moderated by a slope compensation operation) is employed to create a modulating ramp signal that is provided to peak current mode regulation 16. Meanwhile, the DC output voltage is sampled by voltage detector 15 and compared to a reference value that represents the desired DC output voltage. The difference between the two signals is provided to voltage loop compensator 38. In one embodiment, voltage loop compensator 38 is a proportional-integral (PI) controller that generates a compensation signal in response to the difference between the reference voltage and the monitored output voltage, wherein the compensation signal seeks to minimize the difference between the two values (i.e., drive the error between the reference value and the monitored output voltage to zero).

The output of voltage loop compensator 38 and the modulating ramp signal are provided to peak current mode regulator 16, which includes negative half cycle peak current control 24 and positive half cycle peak current control 26. In this embodiment, positive half cycle peak current control 26 compares the modulating ramp signal to the compensation signal or feedback signal generated by voltage loop compensator 38. The width of the PWM signals generated positive half cycle peak current control 26 is based on the result of this comparison. The resulting PWM control signals is provided to power transistors Q1U and Q2L. Likewise, negative half cycle peak current control generates PWM control signals for power transistors Q2U and Q1L, although based on a slightly different input. In this way, peak current mode regulator 16 generates PWM signals that effectively regulate the DC output voltage to a desired value. In other embodiments, the current mode regulation shown in FIG. 2 may be replaced with equivalent control topologies, including voltage mode control (in which the modulating ramp signal derived from the monitored current at location CT1 is replaced with a dedicated saw-tooth signal).

In addition, DC-DC converter 12 includes volt-second (volt-sec) correction feedback loop 18 that monitors and corrects for DC content on the primary winding of transformer T1. The presence of DC content (i.e., magnetizing current) on the primary side of transformer T1 is created as a result of high peak currents and asymmetric switching of the power transistors. If unchecked, the DC content can build with successive switching cycles and cause eventual saturation of transformer T1 that results in degradation and eventual failure of transformer T1. The volt-sec correction loop regulates the DC content on transformer T1 by controlling the average voltage on the primary side of transformer T1.

In the embodiment shown in FIG. 2, volt-second correction feedback loop 18 includes low pass filter (LPF) 28, comparator 30, and volt-second correction compensation block 32. The AC current provided to the primary side of transformer T1 is monitored (as shown by current sensor CT2) and provided to LPF 28, which removes the high-frequency components of the AC current, leaving only the low-frequency or DC components of the AC current.

The DC content is compared with a desired zero current reference and the resulting difference is provided to volt-second correction compensation block 32. In one embodiment, volt-second correction compensation block 32 is a compensation network that calculates the average amount of voltage needed at the primary side of transformer TI in order to compensate for detected DC content. Calculations made by volt-second correction compensation block 32 are based on the magnetizing inductance and resistance of the transformer primary.

As shown in FIG. 2, the output of volt-sec correction block 32 is summed with the output of voltage loop compensation 20 by combination block 33 and provided to negative half-cycle peak current control 24. In response, negative half cycle peak current control 24 compares the summed or combined output of volt-sec correction block 32 and voltage loop compensation 20 with the modulating ramp signal to generate the PWM control signals that are provided to power transistors Q2U and Q1L. By selectively modifying the voltage feedback provided by voltage loop compensation 20 based on the result of volt-sec correction feedback loop 18, the width of the pulses are selectively modified to decrease or reduce DC content within transformer T1. For example, in response to positive DC current content detected on the primary of transformer T1, volt-sec correction block 32 generates a compensation signal that increases the width of pulses generated by negative half cycle peak current control 24, thereby decreasing the average voltage across the primary side of transformer T1. In this embodiment, positive half-cycle peak current control 26 generates PWM pulses to provide to power transistors Q1U and Q2L based on the output of voltage loop compensator 38 and the modulating ramp signal.

Due to the time constant associated with the primary of transformer T1, the compensated signal generated by volt-sec correction block 32 is of a relatively low-frequency as compared with the switching frequency. Therefore, in one embodiment, volt-sec correction block 32 employs proportional-integral control to generate the compensation signal. In other embodiments, the output of volt-sec correction loop 18 could be provided to positive half-cycle peak current control 26, or both positive and negative peak current controllers 24 and 26. The effect of providing a DC content correction signal is power transistors are controlled to remove or minimize the detected DC content from the primary side of transformer T1.

Minimizing DC content within transformer T1 with a control loop, as opposed to prior art methods that employed a DC blocking capacitor or a gapped core transformer, minimizes the size and weight of DC-DC converter 12 and increases output power capability. In this way, DC-DC converter 12 provides regulated voltage to universal AC inverter 14. In addition, the high-frequency switching (i.e., PWM signals applied to power transistor Q1U, Q1L, Q2U, and Q2L) and presence of transformer T1 provides high-frequency DC link isolation that results in galvanic isolation and a wide input to output voltage conversion ratio. The DC link isolation topology shown in FIG. 2 obviates the need for a typical AC isolation transformer provided at the AC output (i.e., inverter side). A benefit of the DC link isolation topology is only a single-phase transformer is required (as opposed to a three-phase transformer required on the AC side) and higher switching frequencies (e.g., 20 kHz as opposed to 60 Hz) allow transformer T1 to be significantly smaller and lighter than an AC isolation transformer.

Figure 3:
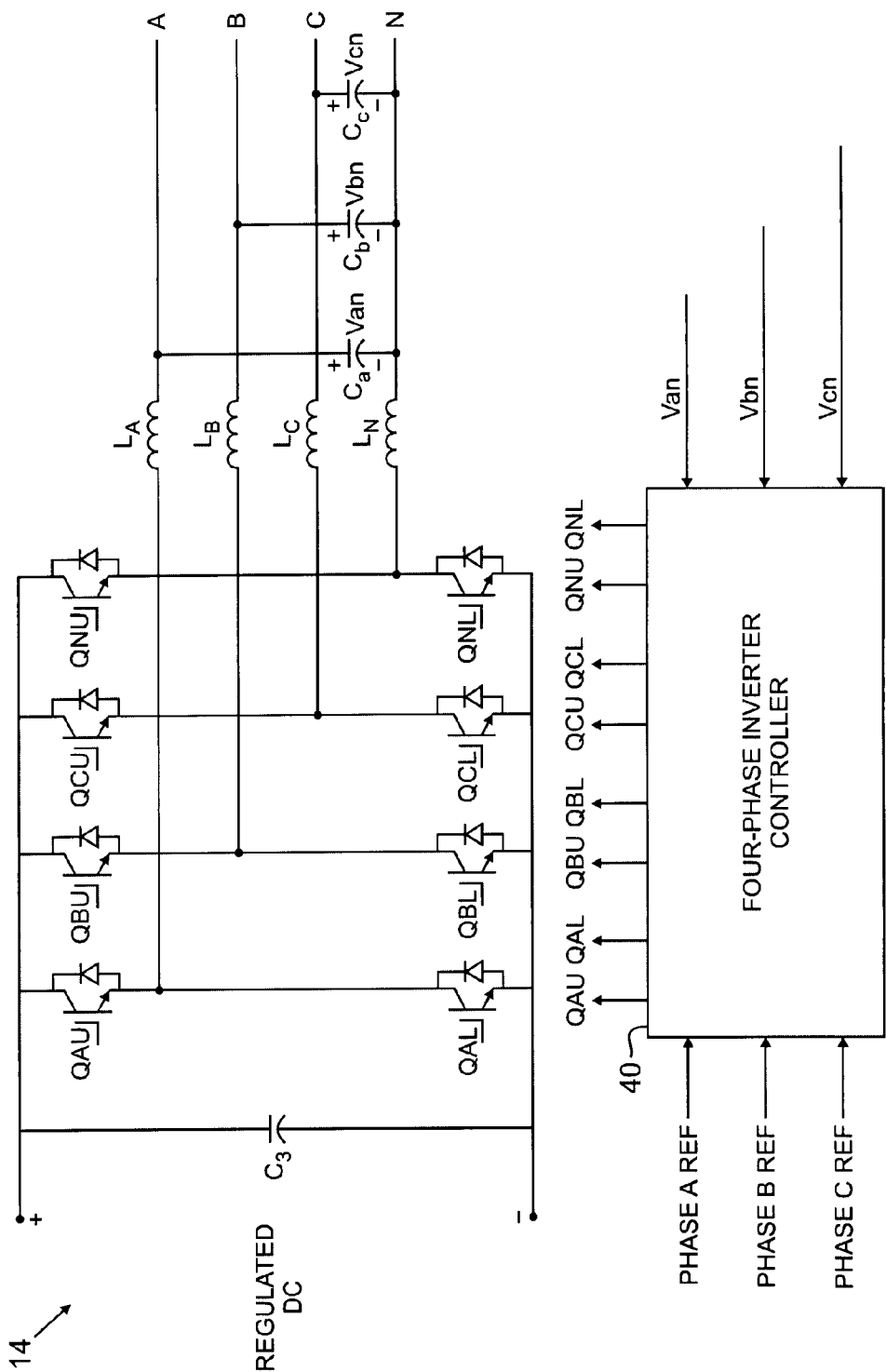
FIG. 3 is a circuit diagram of a four-phase inverter topology used to convert regulated DC input to an AC output.

FIG. 3 illustrates the basic topology of universal AC inverter 14, which includes capacitor C3, power transistors QAU, QBU, QCU, QNU, QAL, QBL, QCL, and QNL, inductors La, Lb, Lc, and Ln, capacitors Ca, Cb, and Cc, and four-phase inverter controller 40. Universal AC inverter 14 receives regulated DC input voltage from DC-DC converter 12, and power transistors QAU, QAL, QBU, QBL, QCU, QCL, QNU, and QNL are controlled by respective PWM control signals provided by four-phase inverter controller 40 to generate a high-quality AC output voltage Va, Vb, and Vc (Vn is a neutral output voltage). Four-phase inverter controller 40 receives feedback voltage corresponding to the generated AC output voltages Va, Vb, and Vc, and reference voltages Va_ref, Vb_ref, Vc_ref representing the desired AC output voltages. Based on these inputs, four-phase inverter controller 40 generates the PWM control signals that control the operation of the power transistors QAU-QNL.

In this embodiment, a four-phase inverter topology is employed to provide a neutral phase. This topology creates an interleave of phase and neutral PWM pulses that results in a higher switching frequency across the inductors La, Lb, Lc, and Ln and thereby reduces the size of the inductors required to provide sufficient filtering. In addition, the absence of the AC output transformer (replaced by the presence of transformer T1 in DC-DC converter 12) allows universal AC inverter 14 to handle higher unbalanced loads than would be possible with the standard AC output transformer. In addition, as shown in FIG. 3, phase to neutral output voltages (as measured across capacitors Ca, Cb, and Cc) are monitored and provided to four-phase inverter controller 40 to facilitate inverter control.

In particular, four-phase inverter controller 40 employs a number of control loops based on the phase to neutral output voltages Van, Vbn, and Vcn (taken across capacitors Ca, Cb, and Cc, respectively) and the phase reference Va_ref, Vb_ref, and Vc_ref values to generate the PWM control signals provided to the power transistors. As discussed in more detail with respect to FIG. 4 below, in one embodiment four-phase inverter controller 40 employs four feedback loops to regulate the AC output voltage. The feedback loops act to provide high-quality AC output voltage despite the connection of linear and non-linear loads to the AC output voltage, and despite variations in the desired magnitude and frequency of the AC output voltage.

Figure 4B:
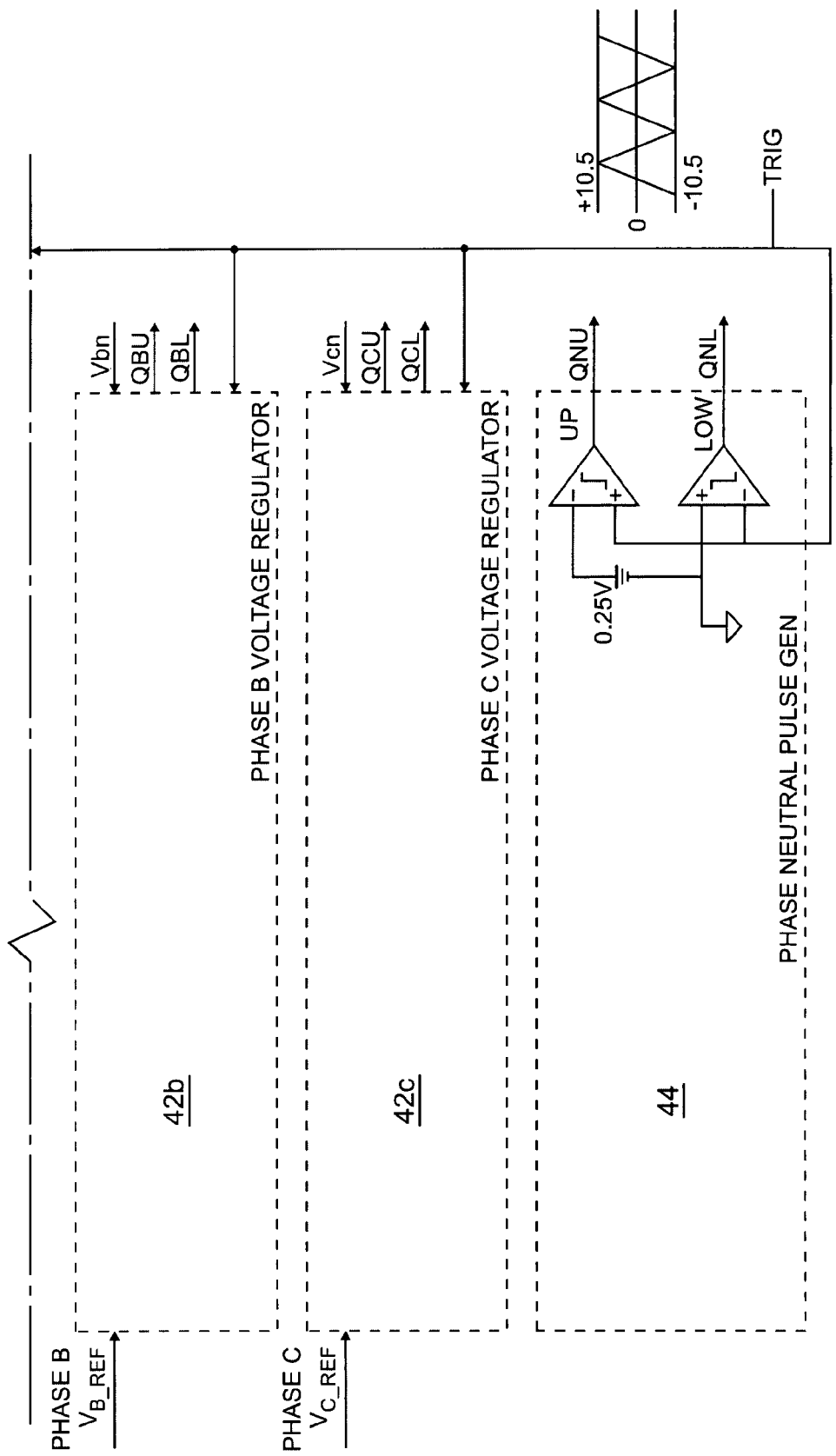
FIG. 4 is a block diagram of control operations performed by inverter controller to maintain a high-quality AC output signal.

FIG. 4 illustrates in more particularity the feedback loops 42a, 42b, and 42c employed by four-phase inverter controller 40 to generate the required PWM control signals to maintain a high-quality AC output voltage despite the connection of linear and non-linear loads. Four-phase inverter controller 40 provides independent feedback loop control for each of the three phases of power (i.e., output voltage Va is controlled by feedback loop 42a, output voltage Vb is controlled by feedback loop 42b, etc.). Each of the feedback loops employed by the three phases of power are identical to one another, therefore only the feedback loop 42a associated with a single phase of power is illustrated in FIG. 4. In addition, control loop 44 is employed to generate a neutral AC output voltage VN by controlling PWM control signals QNU and QNL to a 50% duty cycle.

As discussed above, feedback control loop 42a (as well as feedback control loops 42b and 42c) makes use of four feedback loops to effectively control the AC output voltage VA to a desired output. Feedback control loop 42a includes gain block 50, filter block 52, low-frequency differentiator 54, comparator 56, compensation network 58, root mean square (RMS) calculators 60 and 62, comparator 64, integrator 66, multiplier 67, summer 68, low-frequency differentiators 70 and 72, comparator 74, compensation network 76, gain block 78, comparator 80, integrator 82, summer 84, voltage limiter 86, DC bias voltage 88, and operational amplifiers 90 and 92.

The monitored phase to neutral output voltage Van is provided as input to feedback control loop 42a, along with reference voltage Va_ref. The monitored phase to neutral output voltage Van is provided to gain block 50. In this embodiment, phase to neutral output voltage is providing a high-voltage output (e.g., approximately +/−400 volts). Gain block 50 applies a gain value to the phase to neutral output voltage to reduce the output voltage from +/−400V or 277 Vrms, in this example, to approximately 30 /−5 volts. Filter block 52 removes high-frequency components (including high-frequency remnants of the switching frequency associated with power transistors QAU-QNL and harmonics of the output frequency) from the monitored phase to neutral output voltage Van. For instance, the desired operating frequency of voltage to neutral output voltage Van may be 400 Hz, but the switching frequency applied to transistors QAU and QAL may be 10 KHz or more. Filter block 52 acts to remove the 10 KHz frequency and harmonics. The resulting signal generated by filter block 52 is provided as an input to each of the four feedback loops employed by feedback control loop 42$a$.

The first feedback control loop is a fast voltage control loop that provides a high-frequency response to control the phase to neutral output voltage Van to a value very close to the desired value represented by reference voltage Va_ref. In this embodiment, the fast voltage feedback loop includes differentiator 54, comparator 56, and compensation network 58. Differentiator 54 (in this case, a low-frequency differentiator) introduces a time derivative to the phase to neutral feedback voltage Van that increases the regulation loop response at high frequencies. The result of differentiator 54 is compared to the reference voltage Va_ref by comparator 56. The signal difference between the phase to neutral voltage Van and the reference voltage Va_ref is provided to compensation network 58, which generates an output (compensated signal) that seeks to control the phase to neutral output voltage to exactly track the reference voltage Va_ref (i.e., seeks to drive the difference between the phase to neutral output voltage and the reference voltage to zero). In this embodiment, compensation network 58 is implemented with a pole-zero network, wherein the location of the poles and zeroes define the frequency response of the compensation network. In other embodiments, other well-known control schemes (such as proportional-integral-derivative (PID)) control schemes may be employed. However, the pole-zero network is capable of providing high-frequency response that seeks to quickly mitigate differences between the reference voltage Va_ref and the phase to neutral voltage Van.

The second feedback control loop is a slow voltage feedback that provides a slow frequency response that works in conjunction with the fast voltage control loop to control the phase to neutral output voltage Van to a value represented by the reference voltage Va_ref. In this embodiment, the slow feedback loop includes root mean square (RMS) converters 60 and 62, comparator 64, and integrator 66. RMS converters 60 and 62 convert the AC reference voltage Va_ref and phase to neutral voltage feedback Van to resulting RMS quantities (i.e., DC or low-frequency quantities). The resulting RMS values are compared with one another by comparator 64 and the resulting difference signal is provided to compensation network 66. Once again, compensation network 66 generates an output that seeks to minimize the difference between the RMS value of the phase to neutral output voltage Van and the RMS value of the reference voltage Va_ref. In this embodiment, compensation network 66 is implemented with an integrator that provides a compensation signal that seeks to minimize the difference between the RMS values of the phase to neutral feedback voltage Van and the reference voltage Va_ref. Because of the DC-like or low-frequency nature of changes in the RMS value of the phase to neutral output voltage Van, an integrator control is sufficient to provide accurate tracking of the reference value. Although, in other embodiments any number of suitable control algorithms may be employed to provide feedback control.

In this way, the fast voltage control loop includes a high-frequency response that regulates the phase-to-neutral output voltage to approximate the desired value, while the slow voltage loop provides high gain at low frequencies to regulate the low-frequency or RMS content of the output voltage. The combination of the fast and slow control loops (combined or added together by summer 84) provides a compensation signal that controls the phase to neutral output voltage to closely approximate the reference voltage Va_ref. In addition, this configuration provides accurate tracking of the reference voltage (i.e., a high-quality AC signal) despite load variation.

The third feedback control loop is an AC output capacitor current regulation loop that increases the dynamic response of the system and reduces LC output resonance generated at the output of universal AC inverter 14 to minimize total harmonic distortion (THD). In this embodiment, the AC output capacitor current regulation loop includes low-frequency differentiators 70 and 72, comparator 74, and compensation network 76. Differentiator 72 derives the current through output capacitor Ca by applying a time derivative to the phase to neutral output voltage Van. Likewise, the same time derivative function is applied by differentiator 70 to the reference voltage Va_ref to provide a reference current. The derived current through capacitor Ca is compared to the derived reference current at by comparator 74, and the resulting difference is provided to compensation network 76. Once again, compensation network 76 acts to minimize the difference between the two signals. In this embodiment, compensation network 76 is a pole-zero network that provides a high-frequency response to differences between the derived capacitor current and the derived reference current. The output of the compensation network 76 is combined or added with the output of the fast/slow voltage regulation loops at summer 84.

The fourth and final feedback control loop is an AC output DC content correction loop. The DC content correction acts to reduce or eliminate DC content located on the AC output signal Va. This is particularly important in applications in which the AC output is provided to a load that includes a transformer. The presence of DC content on the AC output may result in saturation and eventual failure of the load transformer. In this embodiment, AC output DC content correction loop includes voltage gain/filter 78, comparator 80, and compensation network 82. Voltage gain/filter 78 isolates DC content on the phase to neutral feedback voltage Van and amplifies the resulting DC content to provide low-frequency voltage feedback. The resulting signal is compared to a reference value (e.g., zero) by comparator 80 and the resulting difference signal is supplied to compensation network 82. In this embodiment, compensation network 82 is an integrator that drives the DC content detected within the phase to neutral output voltage to zero. Once again, because of the low-frequency nature of the DC content, a simple integrator provides sufficient response to minimizing DC content on the AC output voltage. The resulting output of compensation network 82 is provided to summer 84, where it is combined with the results of the other three control loops.

The value representing the sum of the four feedback control loops is used to regulate the PWM signals that are provided to power transistors QAU and QAL. In this embodiment, components used to generate the PWM signals include voltage limiter 86, operational amplifier 92 and 90, DC offset 92, and a triangle wave input Trig. The summed output of the four feedback control loops is provided to voltage limiter 86, which in response generates an output voltage that is limited to the operational range of operational amplifiers 88 and 90

(e.g., −10 to 10 volts). Based on the output signal provided by voltage limiter 86 and the triangle wave input 'trig', operational amplifiers 88 and 90 generate PWM signals that are provided to power transistors QAU and QAL. In addition, DC offset 92 is employed to provide dead-time lockout. The addition of DC offset 92 (e.g., 0.25 V in this example) to the input of the value provided to operational amplifier 88 ensures that power transistors QAU and QAL are not both conducting at the same time.

The remaining feedback loops 42b and 42c operate as described with respect to feedback loop 42a. Feedback loop 42b receives phase to neutral feedback voltage Vbn and reference voltage Vb_ref as inputs, and generates PWM pulses that are provided to power transistors QBU and QBL. Likewise, feedback loop 42c receives phase to neutral feedback voltage Vcn and reference voltage Vc_ref as inputs, and generates PWM pulses that are provided to power transistors QCU and QCL.

Selectively and independently controlling the operation of transistors QAU, QAL, QBU, QBL, QCU, and QCL results in generation of an AC output voltage of desired magnitude and frequency (as defined by reference voltages Va_ref, Vb_ref, and Vc_ref) and an AC output voltage that is capable of providing high-quality AC power for both linear and non-linear loads. In addition, because galvanic isolation between the unregulated DC input and the AC output is provided by DC-DC converter 12, there is no need for an AC transformer on the output of universal AC inverter 14. The result is a small, lightweight AC generator system having the capability to provide a variety of AC outputs (i.e., of varying magnitudes and frequencies) to both linear and non-linear loads.

Although the present invention has been described with reference to preferred embodiments, workers skilled in the art will recognize that changes may be made in form and detail without departing from the spirit and scope of the invention. Particularly, controllers (both for the DC-DC converter and universal AC inverter) have been described with respect to functional components performed by the controllers. The controllers may be reduced to practice in the form of a microprocessor or digital signal processor that includes software for implementing the functional components. Likewise, aspects of the controller may additionally include discrete devices. The regulated DC output can be connected in series/parallel for higher voltage/power operation.

The invention claimed is:

1. A alternating current (AC) generator system comprising:
   a direct-current (DC) to DC converter that includes a first switch, a second switch, a transformer, and a full wave rectifier to convert a DC input voltage to a DC output voltage;
   a DC to DC controller that provides a first pulse width modulation (PWM) signal to the first switch and a second PWM signal to the second switch in response to a monitored output voltage to regulate the DC output voltage to a desired magnitude, wherein the DC to DC controller includes a DC offset control loop that monitors current on a primary side of the transformer, isolates DC content within the monitored current, and generates a DC content compensation signal in response to the isolated DC content that is combined with the monitored output voltage to modify the first PWM signal provided to the first switch such that DC content is minimized within the transformer;
   an inverter that includes a network of switches, at least one output inductor, and at least one output capacitor for converting the DC output voltage provided by DC to DC converter to an AC output voltage of desired magnitude and frequency; and
   an inverter controller that provides control signals to the network of switches based on monitored AC output voltage of the inverter and a reference voltage defining the desired magnitude and frequency, wherein the inverter controller employs a plurality of control loops to generate the control signals provided to the network of switches to provide regulation of the AC output voltage.

2. The system of claim 1, wherein the DC to DC converter provides galvanic isolation between the DC input voltage and the AC output voltage.

3. The system of claim 1, wherein the DC offset control loop includes:
   a low pass filter that isolates DC content within the current monitored on the primary side of the transformer; and
   a volt-second correction network that generates the DC content compensation signal in response to detected DC content provided by the low-pass filter.

4. The system of claim 3, wherein the DC to DC controller includes:
   a voltage feedback loop that provides a feedback signal based on a comparison of the DC output voltage to a DC reference voltage;
   a modulating ramp signal generator that generates a ramp signal;
   a first combiner that adds the voltage feedback signal generated by the voltage feedback loop to the DC content compensation signal to generate a combined signal;
   a first half-cycle peak current controller that compares the combined signal to the ramp signal to generate the first PWM signal; and
   a second half-cycle peak current controller that compares the feedback signal to the modulating ramp signal to generate the second PWM signal.

5. The system of claim 4, wherein the modulating ramp signal generator includes:
   a second combiner for adding a slope compensation signal to a monitored feedback current representing current provided to the first switch and the second switch to generate the modulating ramp signal that is provided to the first half-cycle peak current controller and the second half-cycle peak current controller.

6. The system of claim 1, wherein the inverter controller includes:
   a fast voltage control loop that provides a first compensated signal to regulate differences between the AC output voltage and the AC reference voltage;
   a slow voltage control loop that provides a second compensated signal to regulate differences between a root mean square (RMS) value of the AC output voltage and an RMS value of the AC reference voltage;
   an AC output capacitor current control loop that derives an AC output capacitor current through the at least one capacitor based on the AC output voltage and derives an AC reference current based on the AC reference voltage and provides a third compensation signal to regulate differences between the AC output capacitor current and the AC reference current;
   a DC content control loop that provides a fourth compensation signal to regulate detected DC content within the AC output voltage; and
   a PWM generator that provides PWM control signals to the second network of switches based on the combination of the first, second, third, and fourth compensation signals.

7. The system of claim 6, wherein the fast voltage control loop includes:
   a differentiator for applying a time derivative to the AC output voltage;
   a comparator for comparing the result of the differentiator to the AC reference voltage to generate a first difference signal; and
   a pole-zero compensation network that generates the first compensation signal in response to the difference signal.

8. The system of claim 6, wherein the slow voltage control loop includes:
   a first root mean square calculator for calculating the root mean square of the AC output voltage;
   a second root mean square calculator for calculating the root mean square of the AC reference voltage;
   a comparator for comparing the RMS of the AC output voltage to the RMS of the AC reference voltage to generate a second difference signal; and
   an integrator compensation network that generates the second compensation signal in response to the signal representing the difference between the RMS of the AC output voltage and the RMS of the AC reference voltage.

9. The system of claim 6, wherein the AC output capacitor current control loop includes:
   a first differentiator that derives the AC output capacitor current through the at least one capacitor by applying a time-based derivative to the AC output voltage;
   a second differentiator that derives the AC reference current by applying a time-based derivative to the AC reference voltage;
   a comparator for comparing the derived AC output capacitor current to the derived AC reference current to generate a difference signal; and
   a pole-zero compensation network that generates the third compensation signal in response to the difference between the derived AC output capacitor current and the derived AC reference current.

10. The system of claim 6, wherein the DC content control loop includes:
    a low-pass filter that isolates DC content in the AC output voltage;
    a comparator for comparing the isolated DC content to a desired value to generate a difference signal; and
    a integrator compensation network that generates the fourth compensation signal in response to the difference between the isolated DC content and the desired value.

11. A direct-current (DC) to DC controller connectable to a DC to DC converter that includes a first power transistor, a second power transistor and a transformer, the DC to DC controller comprising:
    a modulating ramp signal generator that generates a modulating ramp signal;
    a voltage compensation loop that monitors a DC output voltage generated by the DC to DC converter and generates an output voltage control signal based on a comparison of the DC output voltage to a DC reference voltage;
    a volt-second correction loop that monitors alternating current (AC) current on a primary side of the transformer, detects DC content within the AC current, and generates a DC content compensation signal based on the detected DC content;
    a combiner that combines the output voltage control signal and the DC content compensation signal to generate a combined signal;
    a first half-cycle peak current controller that generates control signals provided to the first power transistor based on a comparison of the modulating ramp signal to the combined signal; and
    a second half-cycle peak current controller that generates controls signals provided to the second power transistor based on a comparison of the modulating ramp signal to the output voltage control signal.

12. The DC-DC controller of claim 11, wherein the volt-second connection loop includes:
    a low pass filter that isolates the DC content within the AC current monitored on the primary side of the transformer; and
    a volt-second correction network that generates the DC content compensation signal in response to the isolated DC content provided by the low-pass filter.

13. The DC-DC converter of claim 12, wherein the volt-second correction network includes a proportional-integral-derivative (PD) controller that generates the DC content compensation signal in response to the isolated DC content.

14. An alternating current (AC) controller that provides control signals to an inverter topology to regulate an AC output voltage to a desired magnitude and frequency represented by an AC reference signal, the AC controller comprising:
    a fast voltage control loop that provides a first compensated signal to regulate differences between the AC output voltage and the AC reference voltage;
    a slow voltage control loop that provides a second compensated signal to regulate differences between a root mean square (RMS) value of the AC output voltage and an RMS value of the AC reference voltage;
    an AC output capacitor current control loop that derives an AC output capacitor current through the at least one capacitor based on the AC output voltage and derives an AC reference current based on the AC reference voltage and provides a third compensation signal to regulate differences between the AC output capacitor current and the AC reference current; and
    a DC content control loop that provides a fourth compensation signal to regulate detected DC content within the AC output voltage; and
    a combiner that combines the first, second, third, and fourth compensation signals to generate a single compensation signal used by the inverter controller to generate the control signals provided to the inverter topology to regulate the AC output voltage to the desired magnitude and phase.

15. The system of claim 14, wherein the fast voltage control loop includes:
    a differentiator for applying a time derivative to the AC output voltage;
    a comparator for comparing the result of the differentiator to the AC reference voltage to generate a first difference signal; and
    a pole-zero compensation network that generates the first compensation signal in response to the difference signal.

16. The system of claim 14, wherein the slow voltage control loop includes:
    a first root mean square calculator for calculating the root mean square of the AC output voltage;
    a second root mean square calculator for calculating the root mean square of the AC reference voltage;
    a comparator for comparing the RMS of the AC output voltage to the RMS of the AC reference voltage to generate a second difference signal; and an integrator compensation network that generates the second compensation signal in response to the signal representing the difference between the RMS of the AC output voltage and the RMS of the AC reference voltage.

17. The system of claim 14, wherein the AC output capacitor current control loop includes:
- a first differentiator that derives the AC output capacitor current through the at least one capacitor by applying a time-based derivative to the AC output voltage;
- a second differentiator that derives the AC reference current by applying a time-based derivative to the AC reference voltage;
- a comparator for comparing the derived AC output capacitor current to the derived AC reference current to generate a difference signal; and
- a pole-zero compensation network that generates the third compensation signal in response to the difference between the derived AC output capacitor current and the derived AC reference current.

18. The system of claim 14, wherein the DC content control loop includes:
- a low-pass filter that isolates DC content in the AC output voltage;
- a comparator for comparing the isolated DC content to a desired value to generate a difference signal; and
- a integrator compensation network that generates the fourth compensation signal in response to the difference between the isolated DC content and the desired value.

19. The system of claim 14, wherein the magnitude and frequency of the AC output voltage is selectively controlled by modifying the AC reference voltage provided to the inverter controller.

* * * * *

UNITED STATES PATENT AND TRADEMARK OFFICE
CERTIFICATE OF CORRECTION

PATENT NO. : 7,660,135 B2 Page 1 of 1
APPLICATION NO. : 11/805489
DATED : February 9, 2010
INVENTOR(S) : Si Jian Fang It is certified that error appears in the above-identified patent and that said Letters Patent is hereby corrected as shown below:

In the Title, item (54) and col. 1, line 1, delete "inveter" and insert --inverter--

Column 12, Line 10, delete "connection" and insert --correction--

Signed and Sealed this

Twenty-second Day of June, 2010

David J. Kappos
*Director of the United States Patent and Trademark Office*